United States Patent
Bauer et al.

(10) Patent No.: US 7,489,998 B2
(45) Date of Patent: Feb. 10, 2009

(54) METHOD AND DEVICE FOR CONTROLLING AN INTERNAL COMBUSTION ENGINE

(75) Inventors: Erwin Bauer, Lappersdorf (DE);
Dietmar Ellmer, Regensburg (DE);
Thorsten Lauer, Holzheim a. Forst (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/885,026

(22) PCT Filed: Jan. 30, 2006

(86) PCT No.: PCT/EP2006/050520

§ 371 (c)(1),
(2), (4) Date: Aug. 24, 2007

(87) PCT Pub. No.: WO2006/092351

PCT Pub. Date: Sep. 8, 2006

(65) Prior Publication Data

US 2008/0125953 A1    May 29, 2008

(30) Foreign Application Priority Data

Feb. 28, 2005    (DE) .............. 10 2005 009 104

(51) Int. Cl.
*B60T 7/12* (2006.01)
*F02M 7/00* (2006.01)

(52) U.S. Cl. ............ 701/103; 701/104; 123/435; 123/437

(58) Field of Classification Search .......... 701/103, 701/104, 114, 115; 123/434, 435, 673, 437
See application file for complete search history.

(56) References Cited

U.S. PATENT DOCUMENTS

| | | | | | |
|---|---|---|---|---|---|
| 4,624,229 | A | * | 11/1986 | Matekunas | 123/406.41 |
| 6,155,212 | A | * | 12/2000 | McAlister | 123/3 |
| 7,191,738 | B2 | * | 3/2007 | Shkolnik | 123/19 |
| 2005/0166869 | A1 | * | 8/2005 | Shkolnik | 123/19 |

FOREIGN PATENT DOCUMENTS

| | | |
|---|---|---|
| DE | 199 00 738 C1 | 6/2000 |
| DE | 199 52 096 C2 | 5/2001 |

OTHER PUBLICATIONS

Untersuchungen zur homogenen Dieselverbrennung bei innerer Gemischbildung, Fakultät für Maschinenbau Karlsruhe, Dissertation von Eckart Schloz, Jan. 24, 2003, pp. 122-129.

* cited by examiner

*Primary Examiner*—John T Kwon (57) ABSTRACT

According to the invention, prior to or during an intermediate compression around the upper dead center of a piston of an internal combustion engine during a change in charge a predetermined first fuel mixture is metered into the combustion chamber of the respective cylinder. During the intermediate compression, measured values of pressure in the combustion chamber are measured in a predetermined first crankshaft angle window using cylinder pressure sensor. A measurement for a conversion rate of the first fuel mixture is determined based on the detected measured values of the pressure and reference values of the pressure, which characterize the corresponding pressure curve in the combustion chamber when no fuel is metered. A control signal for at least one actuator of the internal combustion engine is determined based on the conversion rate.

17 Claims, 4 Drawing Sheets

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2006/050520, filed Jan. 30, 2006 and claims the benefit thereof. The International Application claims the benefits of German application No. 10 2005 009 104.0 filed Feb. 28, 2005, both of the applications are incorporated by reference herein in their entirety.

FIELD OF INVENTION

The invention relates to a method and device for controlling an internal combustion engine with at least one cylinder, in which a combustion chamber is configured and to which a piston is assigned, with an intake tract, which communicates with the combustion chamber of the cylinder as a function of the position of a gas inlet valve, an exhaust gas tract, which communicates with the combustion chamber of the cylinder as a function of the position of the gas outlet valve, with an injection valve, which is provided to meter in fuel, and with a cylinder pressure sensor, which detects the pressure in the combustion chamber of the cylinder.

BACKGROUND OF THE INVENTION

Rising energy costs and the tightening up of legal provisions relating to permissible fuel consumption or permissible pollutant emissions from motor vehicles, in which internal combustion engines are disposed, mean that it is necessary to take steps on the one hand to reduce the fuel consumption of internal combustion engines and on the other hand to ensure that the pollutant emissions discharged by the motor vehicle are kept low. In this context it is known that internal combustion engines, in particular those operated using gasoline, can be operated at certain operating points using a self-igniting method, also referred to as a homogeneous charge compression ignition, compressed auto ignition or spatial ignition method. With this self-igniting combustion method, the automatic ignition and therefore the combustion pattern are controlled by way of the reactive energy quantity in the cylinder of the internal combustion engine. This energy quantity can for example be provided by means of a very high residual gas level compared with gasoline engine operation with conventional ignition. It is also known for gasoline engines with conventional ignition that the internal combustion engine can be operated with a high exhaust gas recirculation rate in the lower and middle partial load range, to optimize combustion in respect of the consumption and emissions quality criteria.

DE 199 007 38 C1 discloses a method for determining a combustion chamber pressure pattern in an internal combustion engine. With said method an estimated value of a cylinder pressure is estimated as a function of a previous measured value of the cylinder pressure, a cylinder volume assigned thereto and a cylinder volume assigned to the estimated value of the cylinder pressure and a polytropic exponent by means of the polytropic equation. The polytropic exponent is predefined as a function of a cooling water temperature.

SUMMARY OF INVENTION

The object of the invention is to create a method and device for controlling an internal combustion engine, which allow precise control of the internal combustion engine.

The object is achieved by the features of the independent claims. Advantageous embodiments of the invention are characterized in the subclaims.

The object is achieved by the features of the claims. Advantageous embodiments of the invention are characterized in the claims.

The invention is characterized by a method and corresponding device for controlling an internal combustion engine with at least one cylinder, in which a combustion chamber is configured and to which a piston is assigned. The internal combustion engine also has an intake tract, which communicates with the combustion chamber of the cylinder as a function of the position of a gas inlet valve and an exhaust gas tract, which communicates with the combustion chamber of the cylinder as a function of the position of a gas outlet valve. It also has an injection valve, which is provided to meter in fuel, and a cylinder pressure sensor, which detects the pressure in the combustion chamber of the cylinder. Prior to or during an intermediate compression around the upper dead center of the piston during a load change, a predetermined first fuel mass is metered into the combustion chamber. The intermediate compression comes about due to the closing of the gas outlet valve prior to the upper dead center during a load change and the opening of the gas inlet valve after the upper dead center during a load change, which can preferably be set by means of corresponding phase-setting mechanisms.

During the intermediate compression measured values of the pressure in the combustion chamber are detected within a predetermined first crankshaft angle window, during which fuel oxidization can be expected. A measure of the degree of conversion of the first fuel mass is determined as a function of the detected measured values of the pressure and reference values of the pressure, which are characteristic of the corresponding pressure pattern in the combustion chamber, when no fuel is metered in. The degree of conversion is representative of the proportion of the fuel mass oxidized during the intermediate compression. An actuating signal for at least one final control element of the internal combustion engine is determined as a function of the degree of conversion. The degree of conversion allows conclusions to be drawn in a simple manner about a temperature level in the combustion chamber after the intermediate compression and the remaining fuel mass. The temperature in the combustion chamber after the intermediate compression has an influence on the temperature pattern during a subsequent working stroke of the internal combustion engine and therefore on the occurrence of pollutant emissions, for example nitrogen oxide emissions. Also a precise knowledge of the fuel mass still remaining makes it possible to set an air/fuel ratio precisely in the next working stroke. By adjusting the at least one actuating signal for at least one final control element of the internal combustion engine in an appropriate manner as a function of the degree of conversion, it is possible to reduce pollutant emissions effectively and to control the internal combustion engine in a very precise manner.

Precise knowledge of the degree of conversion and taking this into account appropriately when determining the actuating signal for the at least one final control element of the internal-combustion engine in particular allows very precise control of a spatial ignition method.

According to an advantageous embodiment of the invention, the degree of conversion is determined as a function of a definition of a differential area between the measured values and the reference values of the pressure over the first crankshaft angle window. The degree of conversion can thus be determined in a particularly precise manner.

In this context it is advantageous, if the differential area is determined by numerical integration using the trapezoidal method. This can be done in a particularly simple manner on microprocessors used to control internal combustion engines and can be sufficiently accurate at the same time.

It is also particularly advantageous, if the first crankshaft angle window starts with the upper dead center of the load change, as this can be detected very precisely. It is also advantageous, if the first crankshaft angle window ends roughly 30 to 40° after the upper dead center during a load change. This represents a good compromise between the biggest possible proportion of the differential area actually resulting over the entire intermediate compression and at the same time reliable termination prior to the reopening of the gas inlet valve.

According to a further advantageous embodiment of the invention a second fuel mass to be metered in is determined as a function of the degree of conversion, said second fuel mass to be metered into the combustion chamber after the intermediate compression and at the latest within a main compression following the intermediate compression. This allows the air/fuel ratio to be set precisely.

According to a further advantageous embodiment of the invention a crankshaft angle that is characteristic of the position of a metering crankshaft angle range, during which the second fuel mass to be metered in is to be metered in, is determined as a function of the degree of conversion. The second fuel mass to be metered in is metered in after the intermediate compression and at the latest within a main compression following the intermediate compression. It is thus possible for the temperature during the main compression to be influenced specifically by suitable internal cooling of the gases in the internal combustion engine at the level of the fuel particles, thus influencing the discharge of NOX emissions in a decisive manner.

It is particularly advantageous in this context, if the crankshaft angle that is characteristic of the position of the metering crankshaft angle range is an initial crankshaft angle for metering in the second fuel mass to be metered in. However the center of gravity of the second fuel mass to be metered in or the end crankshaft angle for metering in the second fuel mass to be metered in can also be expedient.

According to a further advantageous embodiment of the invention an actuating signal for a phase-setting mechanism for setting a phase of the gas inlet valve lift pattern in relation to a reference point in respect of the crankshaft and/or an actuating signal for a phase-setting mechanism for setting a phase of the gas outlet valve lift pattern in relation to a reference point in respect of the crankshaft is determined as a function of the degree of conversion. This allows very precise setting of the air/fuel ratio during the main compression, particularly in conjunction with very fast phase-setting mechanisms, as with phase-setting mechanisms driven by electric motors.

According to a further advantageous embodiment of the invention an ignition signal for a spark plug is determined as a function of the degree of conversion. It is thus also possible to set a flash point for the mixture precisely even with the spatial ignition method used with gasoline engines, thereby setting the required combustion sequence precisely.

According to a further advantageous embodiment of the invention an actuating signal for a pulse charging valve is determined as a function of the degree of conversion. It is thus possible to influence the air mass supplied in the combustion chamber very quickly, thus allowing the air/fuel ratio to be set very precisely.

According to a further advantageous embodiment of the invention an actuating signal for a cooling device is determined, which is assigned to an external exhaust gas recirculation of the internal combustion engine, also as a function of the degree of conversion. This allows the temperature level of the gas in the combustion chamber to be set very precisely.

According to a further advantageous embodiment of the invention the reference values from a first set of characteristics are determined as a function of a temperature, which is representative of a temperature within the intermediate compression prior to the start of oxidization of the first fuel mass to be metered in and/or the phase of the gas inlet valve lift pattern and/or the phase of the gas outlet valve lift pattern. It is thus possible to determine the reference values in a simple and precise manner.

According to a further advantageous embodiment of the invention at least two measured values of the pressure in the combustion chamber are detected during the intermediate compression within the predetermined second crankshaft angle window, which is predetermined such that the pressure pattern is not a function of the optionally metered in first fuel mass. A polytropic exponent is defined as a function of at least two measured values of the pressure in the combustion chamber. The polytropic exponent is preferably defined and averaged a number of times using different pairs of measured values, thereby enhancing the accuracy of the calculation. Characteristic values of the first set of characteristics are determined or adjusted as a function of the polytropic exponent to at least one of the measured values of the pressure and volumes of the combustion chamber assigned to the characteristic values and the volume of the combustion chamber assigned to the at least one measured value ($p[k]$) of the pressure ($p$). It is thus possible to define or adjust the characteristic values during operation of the internal combustion engine, allowing a high level of precision over the entire operating life of the internal combustion engine. The characteristic values are preferably assigned to respective points of the sets of characteristics, which correspond to the current input variables of the first set of characteristics.

According to a further advantageous embodiment of the invention a setpoint degree of conversion is determined as a function of the first fuel mass to be metered in and/or the phase of the gas inlet valve lift pattern and/or the gas outlet valve lift pattern and the actuating signal for at least one final control element of the internal combustion engine is determined as a function of the setpoint degree of conversion. This allows precise regulation of the combustion process of the internal combustion engine in a simple manner.

BRIEF DESCRIPTION OF THE DRAWINGS

Exemplary embodiments of the invention are described below with reference to the schematic drawings, in which.

Elements with the same structure or function are marked with the same reference characters in all the figures.

DETAILED DESCRIPTION OF INVENTION

Figure 1:
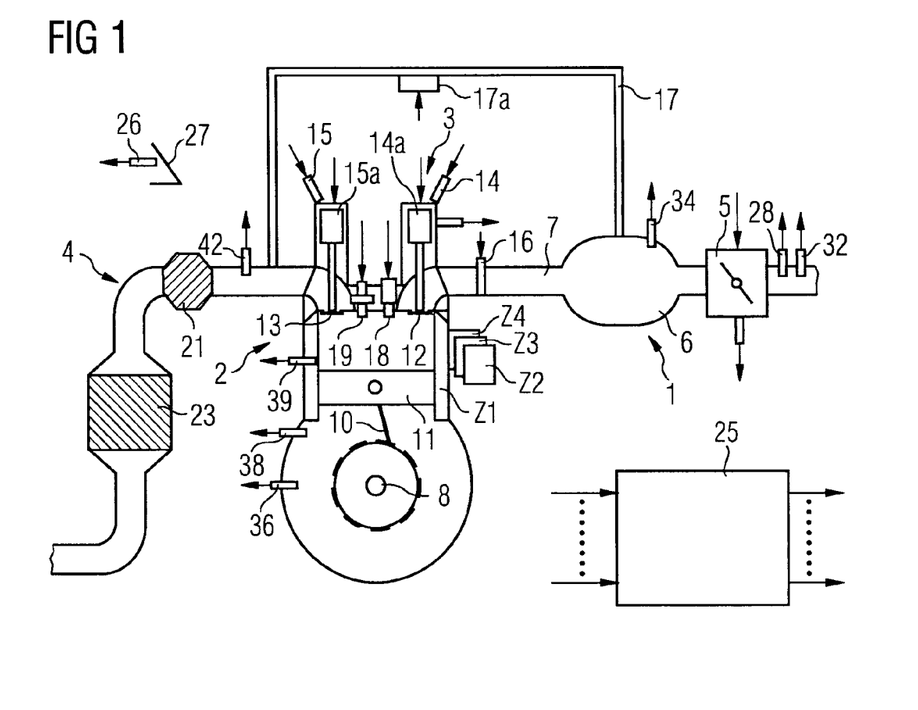
FIG. 1 shows an internal combustion engine with a control device.

An internal combustion engine has an intake tract 1, an engine block 2, a cylinder head 3 and an exhaust gas tract 4. The exhaust gas tract 1 preferably has a throttle valve 5, also a manifold 6 and an intake pipe 7, which leads to a cylinder Z1 via an intake duct into the engine block 2. The engine block 2 also has a crankshaft 8, which is coupled via a connecting rod 10 to the piston 11 of the cylinder Z1.

The cylinder head 3 has a valve drive 14, 15 with a gas inlet valve 12 and a gas outlet valve 13. A phase-setting mechanism 14a, 15a is also preferably assigned to the valve drive 14, 15 respectively for the gas inlet valve 12 and optionally also for the gas outlet valve 13, by means of which phase-setting mechanism 14a, 15a a phase of the gas inlet valve lift pattern or, respectively, the gas outlet valve lift pattern can be adjusted in relation to a reference point in respect of the crankshaft. A pulse charging valve 16 is also preferably disposed in the intake tract 1. An external exhaust gas recirculation 17 can also be provided, being provided with a cooling device 17a to cool the exhaust gases flowing through the external exhaust gas recirculation 17 and being able to be controlled actively by a control facility. Also at least one helical valve can be provided to influence the fluid flow into a combustion chamber of the cylinder Z1.

The cylinder head 3 also has an injection valve 18 and a spark plug 19. The injection valve 18 can alternatively also be disposed in the intake pipe 7.

An exhaust gas catalytic converter 21 is disposed in the exhaust gas tract 4, preferably configured as a three-way catalytic converter. A control device 25 is provided, to which sensors are assigned, which detect different measured variables and respectively determine the value of the measured variable. The control device 25 determines manipulated variables as a function of at least one of the measured variables, said manipulated variables then being converted to one or more actuating signals to control final control elements of the internal combustion engine by means of corresponding actuators. The control device 25 can also be referred to as a device for controlling the internal combustion engine.

The sensors here in the exemplary embodiment are a pedal position sensor, which detects a position of an accelerator pedal 27, an air mass sensor 28, which detects an air mass flow upstream of the throttle valve 5; a first temperature sensor 32, which detects an intake air temperature, an intake pipe pressure sensor 34, which detects an intake pipe pressure in the manifold 6, a crankshaft angle sensor 36, which detects a crankshaft angle, to which a rotational speed is then assigned. A second temperature sensor 28 is also preferably provided, which detects a coolant temperature. A cylinder pressure sensor 39 is also provided, which detects a pressure pattern in the combustion chamber of the cylinder. An exhaust gas probe 42 is provided, which is disposed upstream of the exhaust gas catalytic converter 21 and detects the residual oxygen content of the exhaust gas, its measurement signal being characteristic of the air/fuel ratio in the combustion chamber of the cylinder Z1 and upstream of the exhaust gas probe prior to oxidization of the fuel.

A further exhaust gas catalytic converter 23 can also be disposed in the exhaust gas tract, being configured as a NOx catalytic converter.

Any sub-set of the said sensors or even additional sensors can be present, depending on the embodiment of the invention.

The final control elements are for example the throttle valve, the gas inlet and gas outlet valves 12, 13, the phase-setting mechanisms 14a, 15a, the pulse charging valve 16, the cooling device 17a, the helical valve, the injection valve 18 or the spark plug 19.

As well as the cylinder Z1, further cylinders Z2 to Z4, to which corresponding final control elements and optionally sensors are also assigned, are preferably also provided.

Figure 2:
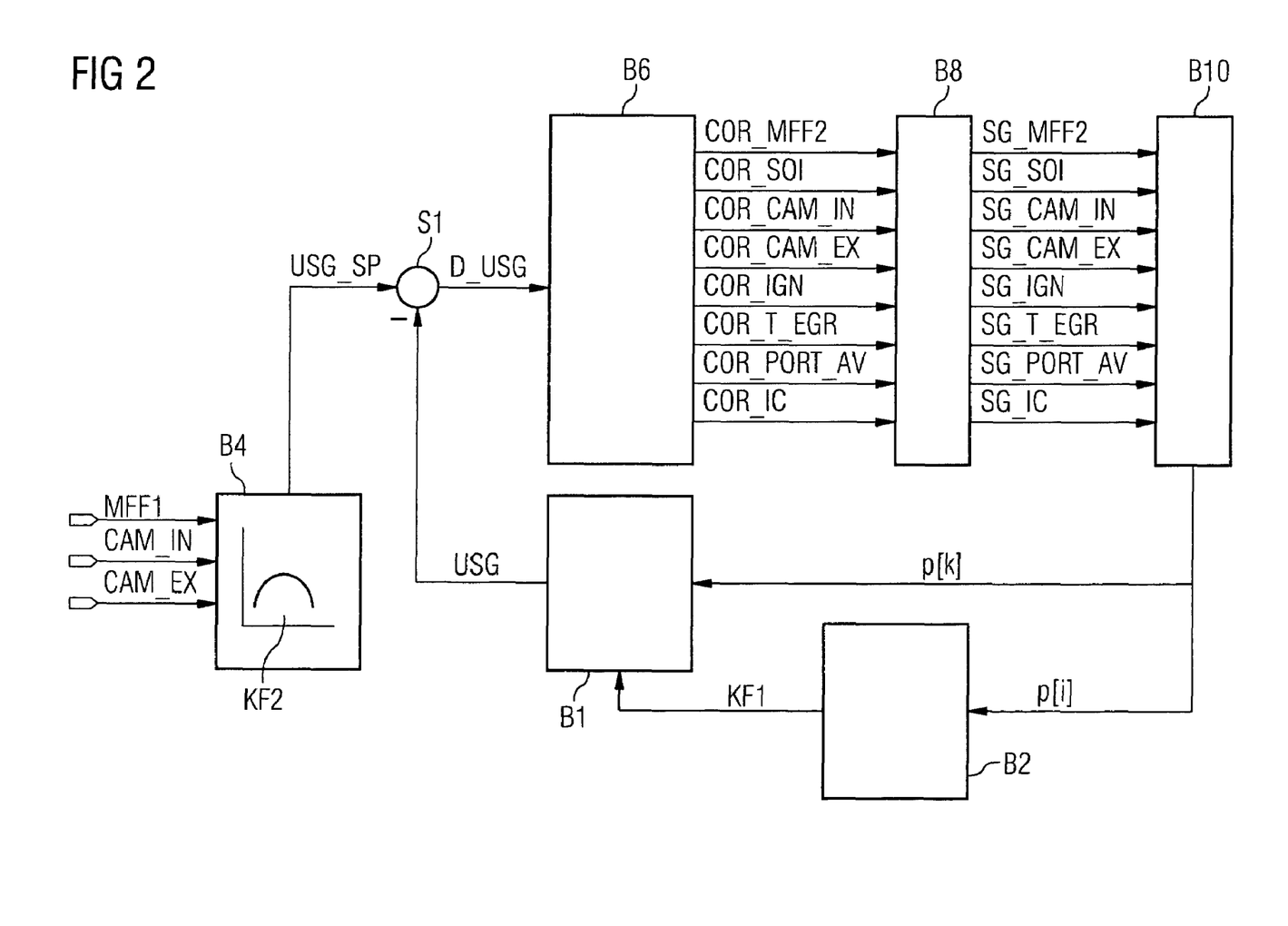
FIG. 2 shows a block circuit diagram of the control device.

The block circuit diagram in FIG. 2 shows the blocks of the control device 25 of relevance to the invention. A block B1 is provided, which is configured to determine a degree of conversion USG as a function of measured values p[i] of the pressure p in the combustion chamber during an intermediate compression. A program for determining the degree of conversion USG is described in more detail below with reference to the flow diagram in FIG. 3. A block B2 is also provided, which is configured to determine or adjust characteristic values of a first set of characteristic values KF1 as a function of detected pressure values p[i] of the pressure in the combustion chamber, which are detected within a second crankshaft angle window. A program for determining the first set of characteristics KF1 is described in more detail below with reference to the flow diagram in FIG. 4. The block B2 does not necessarily have to be part of the control device 25. Alternatively the set of characteristics KF1 can also be stored beforehand in a data storage unit of the internal combustion engine.

A block B4 is also provided, in which a setpoint degree of conversion USG_SP is determined as a function of a first fuel mass to be metered in MMF1, which is metered in the combustion chamber of the cylinder Z1 prior to or during the intermediate compression, the phase CAM_IN of the gas inlet valve 14 and/or the phase CAM_EX of the gas outlet valve 15. To this end a corresponding second set of characteristics KF2 is preferably stored in the block B4, from which the setpoint degree of conversion USG_SP is then determined.

A differential degree of conversion D_USG is determined by establishing the difference between the setpoint degree of conversion USG_SP and the degree of conversion USG in the summing point S1. The differential degree of conversion D_USG is the input variable in a block B6, which comprises a regulator. The regulator of the block B6 can be configured as an input variable regulator, but preferably as a multi-variable regulator. The output variables of the block B6 are preferably correction values, such as a correction value COR_MFF2 of a second fuel mass to be metered in MFF2, which is to be metered into the respective cylinder Z1 to Z4 of the internal combustion engine after the intermediate compression and prior to or during a main compression. The correction values can however also be a correction value COR_SOI for an initial crankshaft angle, a correction value COR_CAM_IN for the phase of the gas inlet valve lift pattern, a correction value COR_CAM_EX for the phase of the gas outlet valve lift pattern, a correction value COR_IGN for an ignition angle of the spark plug 19, a correction value COR_T_EGR for an exhaust gas recirculation temperature or even a correction value COR_PORT_AV for a helical valve position, or even a correction value COR_IC for the pulse charging valve 16, for example. The regulator can be configured to generate corresponding correction values or even just any subset of the correction values.

A block B8 is provided, which is configured to determine actuating signals for the final control elements of the internal combustion engine. This is done as a function of the correction values generated in the block B6 and also preferably as a function of further operating variables of the internal combustion engine, with measured variables and also variables derived therefrom being considered to be operating variables.

Thus in block B8 an actuating signal SG_MFF2 is generated and supplied to meter in the second fuel mass MFF2, an actuating signal SG_SOI is generated and supplied to set the initial crankshaft angle for metering in the second fuel mass to be metered in MFF2, an actuating signal SG_CAM_IN is generated and supplied to activate the phase-setting mechanism 14a. The block B8 is also configured to generate an actuating signal SG_IGN for an ignition signal and an actuating signal SG_T_EGR to activate the cooling device 17a and an actuating signal SG_IC to activate the pulse charging valve 16. The block B8 is also configured to generate an actuating signal SG_PORT_AV for the helical valve. The actuating signals are determined respectively for example as a function of the correction values assigned to them. The block B8 can also be configured to generate additional actuating signals or just a subset of the actuating signals listed.

A block B10 then represents the internal combustion engine, the final control elements of which are set or controlled by means of the actuating signals.

Figure 3:
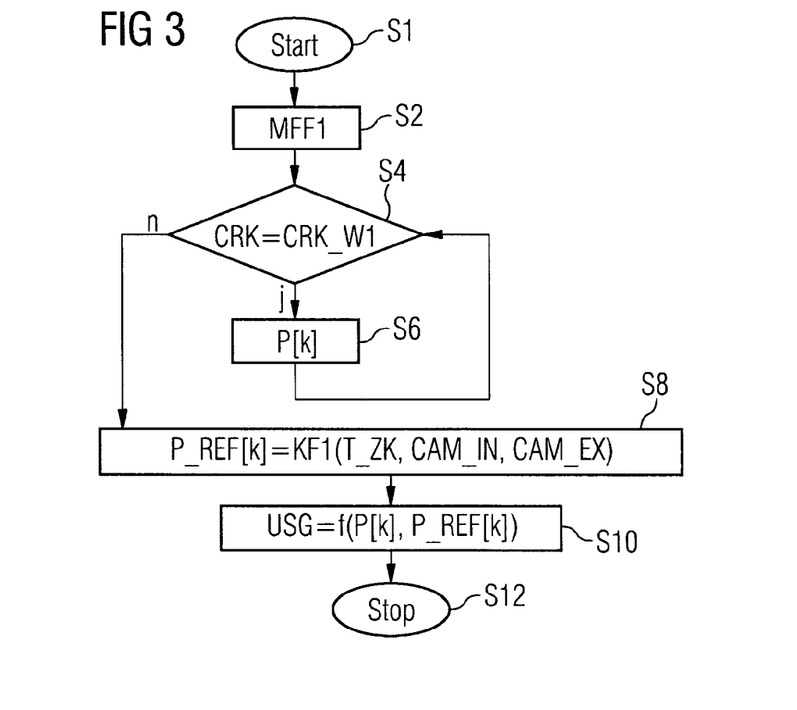
FIG. 3 shows a flow diagram of a first program processed in the control device.

The program for determining the degree of conversion USG is started according to FIG. 3 in a step S1, in which variables are optionally initialized.

In a step S2 the first fuel mass to be metered in MFF1 is determined, as a function of operating variables of the internal combustion engine. The respective injection valve 18 is then activated correspondingly prior to or during the intermediate compression to meter in the first fuel mass to be metered in MFF1. In a step S4 it is checked whether the crankshaft angle CRK is within the first crankshaft angle window CRK_W1. The first crankshaft angle window CRK_W1 is predetermined such that it is within the intermediate compression and within the crankshaft angle range, in which oxidization of the first fuel mass to be metered in MFF1 takes place in the internal combustion engine of the cylinder.

Figure 5:
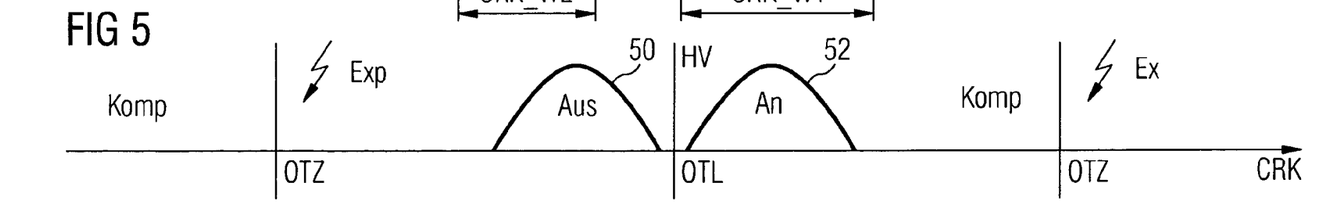
FIG. 5 shows a gas inlet and gas outlet valve lift pattern plotted over the crankshaft angle and FIG. 6 shows the pressure patterns of the pressure in the combustion chamber within an intermediate compression.

An exemplary valve lift pattern with intermediate compression is shown in FIG. 5. The valve lift HV is plotted there over the crankshaft angle CRK. Komp designates a compression stroke, Exp a working stroke, Aus designates a discharge stroke and An designates an intake stroke. OTL is the upper dead center during a load change, OTZ is the upper dead center during ignition of the air/fuel mixture. 50 designates a gas outlet valve lift pattern and 52 a gas inlet valve lift pattern.

Figure 6:
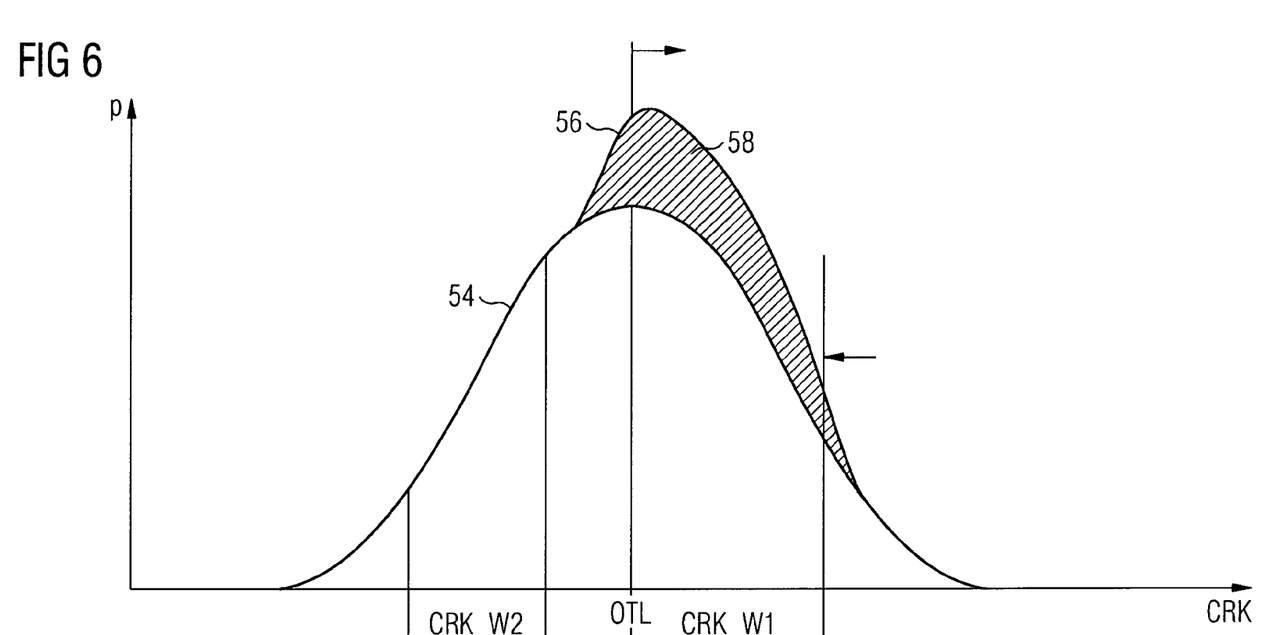

FIG. 6 shows the pressure P in the combustion chamber over the crankshaft angle CRK during the intermediate compression. 54 here designates a reference pressure pattern, 56 an actual pressure pattern and 58 a differential area. The reference pressure pattern is the pressure pattern that would result if the first quantity of fuel to be metered in MFF1 were not metered in. Reference values p_ref[k] are preferably determined from the first set of characteristics KF1.

The first crankshaft angle window CRK_W1 preferably extends from around the upper dead center during a load change OTL to roughly 30 to 40° after the upper dead center OTL during a load change.

If the condition of step S4 (see FIG. 5) is satisfied, in a step S6 a measured value p[k] of the pressure p in the combustion chamber is detected and buffered. Processing is then resumed in step S4, optionally after a predeterminable waiting period or a predeterminable crankshaft angle.

If however the condition of step S4 is not satisfied, processing is continued in a step S8. The step S4 is however preferably left during its first run-through, when the crankshaft angle CRK is within the first crankshaft angle window CRK_W1.

In step S8 reference values p_ref[k] of the pressure in the combustion chamber are determined as a function of the first set of characteristics, preferably by characteristic interpolation, as a function of a temperature T_ZK, which is representative of a temperature within the intermediate compression prior to the start of oxidization of the first fuel mass to be metered in MFF1 and/or the phase CAM_IN of the gas inlet valve 14 and/or the phase CAM_EX of the gas outlet valve 15. In step S8 appropriate corresponding reference values p_ref[k] of the pressure in the combustion chamber are also determined between stored measured values p[k] of the pressure p in the combustion chamber as step S6 is run through.

In a step S10 the degree of conversion USG is then determined as a function of the reference values p_ref[k] and the measured values p[k]. k here designates a counter for measured or reference values, which are assigned to the first crankshaft angle window CRK_W1. In step S10 the degree of conversion USG is preferably determined by numerical integration of the differential area 58, with the reference values p_ref[k] and measured values p[k] being used in this context to carry out the numerical integration. A trapezoidal method is preferably used as the numerical integration method, for example Heun's trapezoidal method. The resulting integral can also be scaled in an appropriate manner. The program is then terminated in a step S12. The program is preferably restarted once per operating cycle of the internal combustion engine, in particular when the internal combustion engine is in what is known as HCCI combustion mode.

Figure 4:
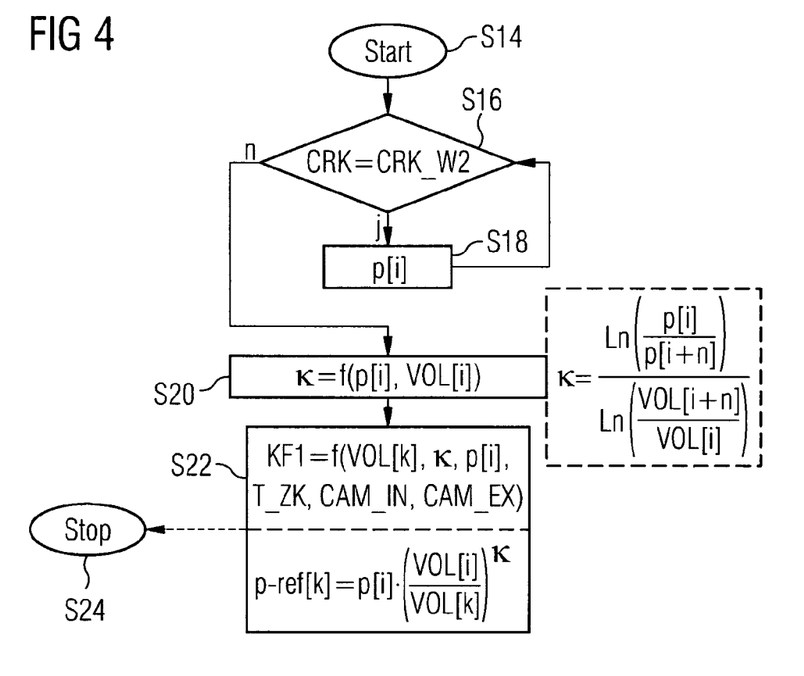
FIG. 4 shows a flow diagram of a further program processed in the control device.

The program for determining or adjusting the first set of characteristics KF1 is started in a step S14 (FIG. 4). Variables are optionally initialized in step S14.

In a step S16 it is checked whether the crankshaft angle CRK is within a second crankshaft angle window CRK_W2. The second crankshaft angle window CRK_W2 is predetermined such that the pressure pattern is not a function of the optionally metered in first fuel mass MFF1. This means that the second crankshaft angle window CRK_W2 ends at the latest with the start of oxidization of the first fuel mass to be metered in MFF1.

The program preferably continues in step S16 during its first run-through until the condition of step S16 is satisfied. When the condition of step S16 is satisfied, in a step S18 a measured value p[i] of the pressure p in the combustion chamber is detected and buffered. Processing is then resumed, optionally after the predetermined waiting period or the predetermined crankshaft angle, in step S16. If however the condition of step S16 is not satisfied, in a step S20 a polytropic exponent κ is determined as a function of at least two measured values p[i] of the pressure p in the combustion chamber, detected during the run-through of step S18, and corresponding volumes VOL[i] of the combustion chamber. This is preferably done by means of the equation given in step S20. It is particularly advantageous here, in respect of a precise determination of the polytropic exponent κ, if this is determined a number of times with different measured values p[i] and corresponding assigned volumes VOL[i]. n here designates any counter. These multiply determined polytropic exponents κ are then averaged, thus giving the actual polytropic exponent κ.

In a step S22 the characteristic values for the first set of characteristics KF1 are determined or even adjusted as a function of volumes VOL[k], which are assigned in particular to the first crankshaft angle window CRK_W1, the polytropic exponent κ, the measured values p[i] of the pressure p in the combustion chamber and preferably also as a function of the current temperature T_ZK, which is representative of the temperature within the intermediate compression prior to the start of oxidization of the first fuel mass to be metered in MFF1, and/or the phase CAM_IN of the gas inlet valve 12 and/or the phase CAM_EX of the gas outlet valve 13.

The corresponding reference values p_ref[k] are preferably determined by means of the equation shown in step S22, representing the polytropic equation. Corresponding checkpoint values of the first set of characteristics KF1 can then be determined or even adjusted as a function of these reference values p_ref[k]. The program is then terminated in a step S24. The program can be processed during regular operation of the internal combustion engine, thus allowing online updating of the set of characteristics KF1. It is characterized by the fact that the pressure pattern determined during the second crankshaft angle window CRK_W2 is extrapolated at least to the region of the first crankshaft angle window CRK_W1. It can however also be extrapolated beyond this.

The invention claimed is:

1. A method for controlling an internal combustion engine with at least one cylinder having a combustion chamber configured and to which a piston is assigned, with an intake tract that communicates with the combustion chamber of the cylinder as a function of the position of a gas inlet valve, with an exhaust gas tract that communicates with the combustion chamber of the cylinder as a function of the position of a gas outlet valve, with an injection valve provided to meter in fuel into the combustion chamber, and with a cylinder pressure sensor that detects a pressure in the combustion chamber of the cylinder, comprising:
  metering a predetermined fuel mass into the combustion chamber prior to or during an intermediate compression approximately at an upper dead center of the piston during a load change of the engine;
  measuring pressure in the combustion chamber during an intermediate compression within a predetermined first crankshaft angle window during which fuel in the combustion chamber is oxidized, the measured pressure resulting in measured pressure values;
  determining a degree of conversion of the first fuel mass as a function of the measured pressure values and reference pressure values which are characteristic of the corresponding pressure pattern in the combustion chamber when no fuel is metered in to the combustion chamber; and
  determining an actuating signal for a final control element of the internal combustion engine as a function of the degree of conversion.

2. The method as claimed in claim 1, wherein the degree of conversion is determined as a function of a definition of a differential area between the measured values and the reference values of the pressure over the first crankshaft angle window.

3. The method as claimed in claim 2, wherein the differential area is determined by numerical integration via a trapezoidal method.

4. The method as claimed in claim 3, wherein the first crankshaft angle window starts with the upper dead center during a load change.

5. The method as claimed in claim 4, wherein the first crankshaft angle window ends approximately 40° after the upper dead center during a load change.

6. The method as claimed in claim 5, wherein the first crankshaft angle window ends approximately 30° after the upper dead center during a load change.

7. The method as claimed in claim 6, wherein a second fuel mass to be metered into the combustion chamber is determined as a function of the degree of conversion, the second fuel mass to be metered into the combustion chamber is metered after the intermediate compression and before an end of a main compression following the intermediate compression.

8. The method as claimed in claim 7, wherein a crankshaft angle that is characteristic of the position of a metering crankshaft angle range, during which the second fuel mass to be metered is metered into the combustion chamber, is determined as a function of the degree of conversion, with the second fuel mass to be metered is metered into the combustion chamber after the intermediate compression and at the latest within a main compression following the intermediate compression.

9. The method as claimed in claim 8, wherein the crankshaft angle that is characteristic of the position of a metering crankshaft angle range is an initial crankshaft angle for metering in the second fuel mass to be metered in into the combustion chamber.

10. The method as claimed in claim 9, wherein an actuating signal for a phase-setting mechanism for setting a phase of the gas inlet valve lift pattern relative to a reference point in respect of the crankshaft and/or an actuating signal for a phase-setting mechanism for setting a phase of the gas outlet valve lift pattern relative to a reference point in respect of the crankshaft is determined as a function of the degree of conversion.

11. The method as claimed in claim 10, wherein an ignition signal for a spark plug is determined as a function of the degree of conversion.

12. The method as claimed in claim 11, wherein an actuating signal for a pulse charging valve is determined as a function of the degree of conversion.

13. The method as claimed in claim 12, wherein an actuating signal for a cooling device is determined as a function of the degree of conversion, where the actuating signal is assigned to an external exhaust gas recirculation.

14. The method as claimed in claim 13, wherein the reference values from a first set of characteristics are determined as a function of a temperature that represents a temperature within the intermediate compression prior to the start of oxidization of the first fuel mass to be metered in to the combustion chamber and/or the phase of the gas inlet valve lift pattern and/or the phase of the gas outlet valve lift pattern.

15. The method as claimed in claim 14, wherein:
  a plurality of measured values of the pressure in the combustion chamber are detected during the intermediate compression within a predetermined second crankshaft angle window, which is predetermined such that the pressure pattern is not a function of the optionally metered in first fuel mass,
  a polytropic exponent is determined as a function of at least two measured values of the pressure in the combustion chamber,
  characteristic values of the first set of characteristics are determined or adjusted as a function of the polytropic exponent, the measured values of the pressure and volumes of the combustion chamber assigned to the characteristic values and the volume of the combustion chamber assigned to the measured value of the pressure.

16. The method as claimed in claim 15, wherein:
  a setpoint degree of conversion is determined as a function of the first fuel mass to be metered in to the combustion chamber and/or the phase of the gas inlet valve lift pattern and/or the phase of the gas outlet valve lift pattern, and
  the actuating signal for the at least one final control element of the internal combustion engine is determined as a function of the setpoint degree of conversion.

17. A device for controlling an internal combustion engine having at least one cylinder with a combustion chamber configured and a piston assigned, with an intake tract that communicates with the internal combustion engine of the cylinder as a function of the position of a gas inlet valve, with an exhaust gas tract that communicates with the combustion chamber of the cylinder as a function of the position of a gas outlet valve, with an injection valve provided to meter in fuel into the combustion chamber, and with a cylinder pressure sensor that detects the pressure in the combustion chamber of the cylinder, comprising:

- a fuel meter that meters a predetermined first fuel mass into the combustion chamber prior to or during an intermediate compression around the upper dead center of the piston during a load change;
- a pressure sensor that measures values of the pressure in the combustion chamber during the intermediate compression within a predetermined first crankshaft angle window during which metered fuel is oxidized;
- a degree of conversion processor that determines a measure of a degree of conversion of the first fuel mass as a function of the detected measured values of the pressure and reference values of the pressure, which are characteristic of the corresponding pressure pattern in the combustion chamber, when no fuel is metered in the combustion chamber; and
- an actuating signal processor that determines an actuating signal for at least one final control element of the internal combustion engine as a function of the degree of conversion.

* * * * *